United States Patent [19]

Bozzelli et al.

[11] 4,147,852
[45] Apr. 3, 1979

[54] HIGH MOLECULAR WEIGHT POLYMERS OF PHENYLMALEIC ANHYDRIDE

[75] Inventors: John W. Bozzelli; Kent S. Dennis, both of Midland, Mich.

[73] Assignee: The Dow Chemical Company, Midland, Mich.

[21] Appl. No.: 599,193

[22] Filed: Jul. 25, 1975

[51] Int. Cl.$^2$ .............................. C08F 4/04; C08F 4/34
[52] U.S. Cl. ................................ 526/272; 260/30.4 R; 260/32.8 R; 526/218; 526/228; 526/232; 526/271; 528/496
[58] Field of Search .................... 450/729; 260/78.5 R; 526/271, 272, 232, 218, 228

[56] References Cited

U.S. PATENT DOCUMENTS

| | | | |
|---|---|---|---|
| 3,423,355 | 1/1969 | Verdol et al. | 260/32.8 |
| 3,423,373 | 1/1969 | Verdol et al. | 260/78.5 |
| 3,725,360 | 4/1973 | Adams | 260/78.5 R |

OTHER PUBLICATIONS

Polymer Processes, Schildknecht, vol. X, pp. 175 & 176 (1956).

Primary Examiner—Stanford M. Levin

[57] ABSTRACT

Relatively large amounts of initiator and short reaction times produce high molecular weight copolymers of phenylmaleic anhydride with a monomer such as styrene whereas normally these conditions would be expected to produce low molecular weight copolymers. Additionally, it was found that the molar ratio of phenylmaleic anhydride and comonomers such as styrene should be controlled to about 1:3 to 1:6 to obtain the high molecular weight desired. Limited use of inert solvents is possible.

6 Claims, No Drawings

HIGH MOLECULAR WEIGHT POLYMERS OF PHENYLMALEIC ANHYDRIDE

BACKGROUND

Much patent and technical art has developed around anhydride copolymers such as styrene-maleic anhydride copolymers. The polymers find many uses including molding resins, thermosettable resins when mixed with crosslinking agents such as glycols or diamines, aqueous thickeners and binders when converted to the salt form, etc.

Initial attempts to make similar copolymers of styrene and phenylmaleic anhydride produced relatively low molecular weight copolymers using conventional polymerization methods. To improve the physical properties, it was desirable to make high molecular weight copolymers. However, this proved to be difficult to accomplish.

SUMMARY OF THE INVENTION

After many attempts to make higher molecular weight copolymers of phenylmaleic anhydride it was discovered that if a mixture of 6 moles of styrene to 1 mole of phenylmaleic anhydride was polymerized in a short period of time in the presence of a relatively large amount of initiator that a copolymer was produced which had a molecular weight of about 500,000. The polymer composition was about a 3:1 molar ratio, respectively, of the charged monomers so the excess styrene acted as a solvent.

This high molecular weight was unexpected since addition polymerization under these conditions normally would be expected to produce low molecular weight copolymers. Yet, in the present instance the opposite occurred.

Further work showed that under these conditions polymers could be readily made with a solution viscosity greater than about 12 cps when measured as a 10% solution in methyl ethyl ketone at 25° C. The description which follows provides additional details of the variations of materials and conditions which have been found to be permissible.

DESCRIPTION

Normally, a polymer chemist would expect to obtain low molecular weight polymers by conducting the polymerization for a short period of time with relatively large amounts of initiator. To obtain high molecular weight he would decrease the initiator level and use long reaction times. Another factor affecting molecular weight is the temperature of polymerization. Higher temperatures generally produce lower molecular weight and lower temperatures produce higher molecular weight.

In contrast to these generally expected results this invention has discovered that high molecular weight polymers can be prepared from phenylmaleic anhydride (PMA) employing conditions contrary to those above, i.e. short reaction times, higher initiator levels and slightly elevated temperatures.

This invention concerns high molecular weight copolymers of monovinyl aromatic monomers and PMA and a process for making them. Initial attempts were only able to make copolymers of, for example, styrene and PMA, with a viscosity of about 1 to 3 cps. While these polymers have various uses their utility as molding resins was deficient because of poor physical properties due to the low molecular weight.

When it was discovered the copolymers had very high heat distortion properties as a result of the PMA it was considered desirable to make polymers with a viscosity of about 8 to 12 cps and preferably even higher. The first efforts in this direction were relatively unsuccessful.

Then it was discovered that very high molecular weight copolymers of styrene and PMA resulted if relatively large amounts of initiator were used and the polymerization conducted at slightly elevated temperatures for short periods of time. Additionally, it was discovered that the molar ratio of styrene to PMA in the monomer mixture should be controlled at about 3:1 to 6:1. Optionally, it was found that inert solvents had limited use.

Further investigation of the process disclosed that it was not limited to styrene, but other monovinyl aromatic monomers could be employed. Other monomers of this type include vinyltoluene, halogen substituted monomers such as ar-halostyrene, alkyl substituted monomers such as t-butylstyrene and the like. It would be possible to employ polyvinyl monomers such as divinylbenzene, but such monomers lead to crosslinking. Highly crosslinked polymers would be difficult to fabricate but they may well have other uses. Accordingly, only very small amounts of divinylbenzene and like monomers may be used. Other monomers such as acrylate esters were not found to be readily copolymerizable with PMA in this type of process.

Phenylmaleic anhydride is a known compound. One method for its preparation is described in U.S. Pat. No. 3,704,251. This patent can be consulted for preparative procedures since this invention is not concerned with this subject.

Investigation showed that PMA polymerizes, for example, with styrene in a molar ratio of about 1:3. It appears the phenyl substituent introduces a steric factor which limits the amount of PMA in the copolymer to at most about 25 mole percent. Maleic anhydride, in constrast, copolymerizes with styrene in equal molar amounts. Steric hindrance is a possible explanation of why high molecular weight copolymers are formed so rapidly, because as long as unpolymerized PMA is present steric hindrance limits or excludes a number of chain-terminating reactions. There is no intent to be held to this possible explanation since other unknown factors may be equally or more important to obtain high molecular weight. This explanation, of course, does not necessarily mean copolymers with less than 25 mole percent PMA cannot be made. As with all polymers these mole percentages are averages.

Molecular weights are sometimes difficult to determine accurately. For this reason the polymers herein have been defined by their solution viscosity when measured as a 10% by weight solution in methyl ethyl ketone at 25° C. As a rough measure of weight average molecular weights, a viscosity range of about 8 to 12 cps represents a molecular weight range of about 100,000 to 300,000. The polymers made by the process herein have a viscosity greater than about 12 cps or, in general, greater than about 300,000.

To further illustrate this invention the following non-limiting examples are presented. All parts and percentages are by weight unless otherwise specified.

EXAMPLE 1

A polymerization flask fitted with a thermometer, temperature control means, stirring means, a condenser, nitrogen inlet, etc. was charged with 53.8 grams of styrene (0.516 mole), 15 grams of PMA (0.086 mole) and 0.12 gram of benzoyl peroxide (0.174%) and purged with nitrogen for 10 minutes. The temperature was raised to 80° C. and held thereat for two hours while the contents were stirred. After two hours the reaction mixture was too viscous to stir and the heat was removed. The percent solids was about 24%. The reaction mixture was then cooled and left overnight. The copolymer was dissolved in tetrahydrofuran and recovered by precipitation in methanol. The resulting product contained 36% PMA (25 mole %) by titration and had a molecular weight of about 500,000, estimated from its inherent viscosity.

EXAMPLE 2

The procedure of Example 1 was repeated except that a portion of the polymer produced after 1.8 hours (about 28% solids in reaction mixture) was recovered. The copolymer contained 36.5% PMA and had a viscosity of 22 cps.

The remaining portion was left at room temperature overnight (16 hrs) and the polymer recovered. This polymer contained 32% PMA and had a viscosity of 151 cps.

EXAMPLE 3

Using the same amounts of styrene and PMA the method of Example 1 was repeated, but about 0.35% benzoyl peroxide was added in two increments. The reaction mixture was diluted to contain 18.3% toluene and 13.3% methyl ethyl ketone. The polymerization was conducted at 80° C. for four hours and the polymer recovered. The copolymer of styrene-PMA contained 27% PMA and had a viscosity of 16.5 cps.

EXAMPLE 4

Several vial runs were made at 80° C. using an oil bath to heat the vials. After adding the monomers to the vials, the vials were purged with nitrogen, sealed and held in the oil bath for two hours. The polymer was then recovered and analyzed.

A. A 3:1 molar ratio of styrene:PMA was polymerized as described by adding 9.19 grams of styrene, 5.12 grams of PMA and 0.3% benzoyl peroxide to a vial. The percent solids was 86% after 2 hours. The polymer contained 34.5% PMA and had a viscosity of 35.1 cps.

B. Run A was repeated except that 10 parts of methyl isobutyl ketone solvent per 100 parts of monomer was added. After 2 hours the percent solids was 56.4%. The polymer contained 35% PMA and had a viscosity of 15.2 cps.

C. A 6:1 molar ratio of styrene:PMA was tested using lauroyl peroxide, 0.3%, as the initiator with no inert solvent. After 2 hours the percent solids was 45%. The polymer contained 34% PMA and had a viscosity of 14.8 cps.

D. A 6:1 molar ratio of t-butylstyrene:PMA was polymerized using 0.3% benzoyl peroxide as initiator. The percent solids was 58.6%, the percent PMA was 26% and the viscosity was 16.6 cps.

E. An attempt to copolymerize methyl methacrylate with PMA by this procedure was unsuccessful.

Based on the above results as well as a great number of other polymerizations, some of which will be described later, the process is believed to be limited to the polymerization of monomer mixtures containing about 3 to 6 moles of a monovinyl aromatic monomer per mole of PMA. Preferably the 6:1 ratio is employed since the excess styrene acts as a solvent. Preferably no inerts solvents are used, although some solvent(s), if not used in too large an amount, may be employed. Generally it is best to limit the inert solvent to at most about 10 parts per 100 parts of monomer.

The reaction time should be kept short. Times as long as four hours have been used successfully but preferably the time is kept to about two hours or less. The copolymerization with PMA is quite rapid so longer times are not necessary. Long reaction times have the disadvantage that there is an unaccountable loss of anhydride functionality which occurs under some conditions.

Heating is beneficial to the rapid production of high molecular weight polymers but the temperature should not exceed about 100° C. since lower molecular weight results at temperatures above this level. Preferably the temperature is about 70° to 90° C. A variety of free radical initiators are available which actively initiate polymerization in this temperature range. Typical initiators which may be used are benzoyl peroxide, lauroyl peroxide, decanoyl peroxide, acetyl perioxide, azobisisobutyronitrile, and the like. Any initiator which is active in this temperature range may be used.

The initiator level employed is about 0.15 to 1% by weight of the monomers, which is a relatively high level. Levels of about 0.175 to 0.3% appear to be quite effective. In those polymerizations where the 6:1 monomer ratio is employed the initiator level is effectively double this amount since no significant polymerization of styrene itself occurs as long as unpolymerized PMA is present.

To further illustrate why the above limits on the process were imposed, the results of some earlier work are presented below. When the molar ratio of styrene:PMA is large, normal polymerization results are obtained. The three runs below were made with a 15:1 molar ratio of styrene to PMA at a temperature of 80° C. using 0.4% benzoyl peroxide and no inert solvents.

| Polym. Time | % PMA in Polymer | Polymer Visc. | %* Solids |
|---|---|---|---|
| 2 hr. | 24.3% | 1.89 cps | 14.5 |
| 5.5 hr. | 19.5% | 6.17 cps | 30.0 |
| 6.1 hr. | 12.9% | 4.66 cps | 50.0 |

*Of reaction mixture at end of indicated time.

Additional runs similar to the above for longer periods of time up to 24 hours at about half this initiator level produced higher polymer viscosities, most of them in the range of 8–10 cps, with none exceeding 12 cps.

A series of runs made with no initiator at temperatures of 120° to 140° C. to thermally initiate polymerization for periods of time from 1 hour to 14 hours produced polymers with viscosities of 3.5 to 6.2 cps and low percent PMA.

The polymers of this invention, by virtue of their high molecular weight, are useful as molding resins especially because of their high heat distortion properties. In addition, the polymers are useful as thermosettable polymers where the anhydride group is available as a reactive crosslinking site with polyfunctional reactants such as glycols, diamines and the like. The polymers are useful as gelling agents for organic liquids by adding ammonia or other suitable basic materials to solvents or dispersions of the polymers. Organic solutions of the polymers are also useful as coating materials since a liquid film can be readily cast on a substrate and the solvent evaporated. The polymers are also readily modified by reaction with monohydric alcohols to form the half esters. In this manner the properties of the polymers can be modified or "tailored" for the specific demands of a particular use. In many respects the high molecular weight polymers of this invention or the various derivatives made by reaction of the anhydride group would be useful in many of the areas of use known for similar polymers such as styrene-maleic anhydride copolymers.

What is claimed is:

1. A process for making high molecular weight polymers of phenylmaleic anhydride and one or more monovinyl aromatic monomers wherein the polymer has a viscosity greater than about 12 cps when measured as a 10% by weight solution in methyl ethyl ketone at 25° C., said process comprising
    (a) reacting a mixture of 3 to about 6 moles of the aromatic monomer per mole of phenylmaleic anhydride, containing a free radical initiator, in the absence of solvent for about 4 hours or less at a temperature up to about 100° C. sufficient to activate the initiator, wherein the initiator is present in relatively large amounts of about 0.15 to 1% by weight of the monomers, and
    (b) recovering the polymer formed.

2. The process of claim 1 wherein the temperature is about 70° to 90° C.

3. The process of claim 1 wherein the initiator concentration is about 0.175 to 0.3%.

4. The process of claim 1 wherein the monomer ratio is 6 to 1.

5. The process of claim 1 wherein the aromatic monomer is styrene.

6. The process of claim 1 wherein the aromatic monomer is t-butylstyrene.

* * * * *